United States Patent
Fuhrer

(10) Patent No.: US 8,324,887 B2
(45) Date of Patent: Dec. 4, 2012

(54) DEVICE FOR DETERMINING THE ROTATIONAL SPEED OF A TRANSMISSION SHAFT

(75) Inventor: Kim Fuhrer, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 461 days.

(21) Appl. No.: 12/602,262

(22) PCT Filed: May 27, 2008

(86) PCT No.: PCT/EP2008/056459
§ 371 (c)(1),
(2), (4) Date: Nov. 30, 2009

(87) PCT Pub. No.: WO2008/145644
PCT Pub. Date: Dec. 4, 2008

(65) Prior Publication Data
US 2010/0176797 A1    Jul. 15, 2010

(30) Foreign Application Priority Data
Jun. 1, 2007   (DE) .......................... 10 2007 025 666

(51) Int. Cl.
*G01P 3/42*   (2006.01)
(52) U.S. Cl. ........ 324/160; 324/161; 324/162; 324/163; 324/164; 324/165; 324/136; 324/207.25; 324/207.2; 324/207.15; 324/207.17; 324/207.22
(58) Field of Classification Search ............. 324/207.25, 324/136, 207.22, 207.2, 207.15, 207.17, 324/160–165
See application file for complete search history.

(56) References Cited

U.S. PATENT DOCUMENTS

| | | | |
|---|---|---|---|
| 4,817,470 A | 4/1989 | Muller et al. | |
| 5,335,764 A | 8/1994 | Leitner et al. | |
| 6,182,518 B1* | 2/2001 | Baur | 73/865.9 |
| 6,535,135 B1 | 3/2003 | French et al. | |
| 2004/0132580 A1* | 7/2004 | Metzger et al. | 477/101 |
| 2004/0237271 A1* | 12/2004 | Ikeda et al. | 29/25.35 |
| 2005/0109140 A1* | 5/2005 | Miller et al. | 74/331 |
| 2006/0037422 A1* | 2/2006 | Kuhstrebe et al. | 74/340 |
| 2006/0145881 A1* | 7/2006 | Sakatani et al. | 340/679 |
| 2007/0182362 A1* | 8/2007 | Trainor et al. | 320/101 |
| 2009/0183566 A1 | 7/2009 | Fuhrer | |

FOREIGN PATENT DOCUMENTS

| | | |
|---|---|---|
| DE | 41 13 128 A1 | 10/1992 |
| DE | 197 03 488 A1 | 8/1998 |
| DE | 10 2006 023 554 A1 | 11/2007 |
| JP | 03181657 A | 8/1991 |
| JP | 10 024881 A | 1/1998 |

* cited by examiner

Primary Examiner — Minh N Tang
Assistant Examiner — Son Le
(74) Attorney, Agent, or Firm — Davis & Bujold, P.L.L.C.

(57) ABSTRACT

A device for determining the rotational speed of a transmission shaft (12). The device includes a rotational speed indicator (3) connected, in a rotationally fixed manner, to the transmission shaft (12) and at least one rotation speed sensor (2) including at least one sensor element (10). By way of the sensor element (10), the speed of the transmission shaft (12) is detected via the speed indicator (3). The speed sensor (2) is attached to a shifting element (5) for actuating a sliding sleeve (4) of a clutch device (1) that is connected to the transmission shaft (12) in such a manner that the sliding sleeve (4) axially movable on but fixed so as not to rotate.

11 Claims, 2 Drawing Sheets

DEVICE FOR DETERMINING THE ROTATIONAL SPEED OF A TRANSMISSION SHAFT

This application is a National Stage completion of PCT/EP2008/056459 filed May 27, 2008, which claims priority from German patent application serial no. 10 2007 025 666.5 filed Jun. 1, 2007.

FIELD OF THE INVENTION

The present invention concerns a device for determining the rotational speed of a transmission shaft. Moreover the invention concerns a transmission, in particular for a motor vehicle, with such a device.

BACKGROUND OF THE INVENTION

From the prior art, transmissions are known, which comprise rotational speed detection devices for generating a speed signal, for a motor vehicle. These rotational speed detection devices comprise in essence a signal emitter or speed indicator connected rotationally fixed to a corresponding transmission shaft, this being associated with a fixed speed sensor in order to measure the rotational speed from the speed indicator.

In known motor vehicle transmissions with two countershafts, a main shaft is mounted with sufficient play between a drive input and a drive output shaft, in such manner that during operation under load the main shaft is automatically centered. Owing to the play provided, in the load-free condition and while rotating the main shaft can undergo a certain amount of movement and may move away from its nominal position both axially and radially. The types of movement involved here range from radial flutter to a so-termed wobbling motion in which the ends of the main shaft move in opposite directions. From the prior art rotational speed measurement takes place by virtue of a toothed disk connected fixed on the main shaft and a sensor, which can be arranged radially or axially on the toothed disk. A disadvantage of this is that if the main shaft is wobbling, the toothed disk fixed on the main shaft also follows this wobbling motion. Since such a toothed disk has a relatively large diameter, the movements of the toothed disk produced by the wobbling motion are also correspondingly ample. However, for measurement technology reasons the toothed disk must only move within a very narrow tolerance range. If it moves outside this tolerance range exact rotational speed measurement can no longer be guaranteed, because the teeth of the toothed disk or the gaps between them can no longer be detected reliably by the sensor. Furthermore, in such a case a 'smart' sensor has to be used, which will emit a correct signal despite the wobbling motion of the main shaft. Such a sensor, however, is substantially more expensive than a conventional rotational speed sensor with no additional evaluation electronics. Besides, the structural length of the transmission is increased by the thickness of the toothed disk.

In the previously unpublished application with file number 10 2006 023 554 by the present applicant, an arrangement for determining the rotational speed of a transmission shaft is disclosed. This arrangement comprises a speed indicator connected in a rotationally fixed manner to the transmission shaft, and a fixed speed sensor by which the speed can be measured from the speed indicator. The speed indicator is provided at the circumference of an axially movable sliding sleeve arranged in a rotationally fixed manner on the transmission shaft. The speed sensor is arranged on a long sensor arm and is positioned on the sliding sleeve in such a manner that the rotational speed can be determined from the speed indicator in the radial direction.

A disadvantage of this is that to position the speed sensor a long, freely suspended sensor arm is needed. The longer such a sensor arm is, the greater is the risk that an external vibration excitation will cause the arm itself to vibrate. Such vibration can result in an erroneous speed signal. In this case too, therefore, a 'smart' sensor has to be used, which will deliver a correct signal despite the wobbling motion of the main shaft. To avoid clashes during a shifting operation the sensor arm must be able to enter a shift fork opening, so the shift fork arms must be designed asymmetrically and the shift fork cannot be made too massive.

SUMMARY OF THE INVENTION

The purpose of the present invention is to provide a device for determining the rotational speed of a transmission shaft, by means of which the speed can be determined reliably and by which the disadvantages of the prior art are eliminated or minimized.

The objective addressed by the invention is achieved by a device for determining the rotational speed of a transmission shaft, of the type in question, which also embodies the characterizing features specified in the principal claim.

The device according to the invention for determining the rotational speed of a transmission shaft comprises a speed indicator connected in a rotationally fixed manner to a transmission shaft and at least one rotational speed sensor. The speed sensor comprises at least one sensor element by means of which the rotational speed of the transmission shaft at the speed indicator can be measured. According to the invention, the speed sensor is attached to a sliding sleeve of a clutch device that can move axially relative to the transmission shaft and is connected in a rotationally fixed manner on it. For this purpose the speed sensor can for example be screwed or riveted to the shift element, or welded thereto. The speed sensor can for example be in the form of a Hall-effect sensor or an inductive sensor, and the transmission shaft can for example be a main shaft of a motor vehicle transmission.

In a preferred embodiment of the device according to the invention, the speed indicator is provided at the circumference of the sliding sleeve of the clutch device, which can be moved in the axial direction to a neutral position, a first clutch position and a second clutch position. By means of the sliding sleeve transmission components to be coupled can be connected in a rotationally fixed manner to the corresponding transmission shaft. The transmission components to be coupled are preferably in the form of so-termed loose gearwheels which are arranged to rotate on the transmission shaft but can be connected in a rotationally fixed manner to it by corresponding, claw-like short teeth arranged for example on the sides of the loose gearwheels, by means of the sliding sleeve. To facilitate the shift, such clutch devices can be supplemented by synchronizing and/or blocking synchronizer devices.

In a particularly preferred embodiment of the device according to the invention, the sliding sleeve has external teeth which can be brought into engagement with the internal teeth of a transmission component to be coupled, in particular a loose gearwheel. In this embodiment the speed indicator is formed by the external teeth of the sliding sleeve, i.e. the external teeth, in unmodified form, can also be used as the speed indicator.

In a further preferred embodiment of the device according to the invention, the sliding sleeve has an annular groove in which the shift element for actuating the sliding sleeve engages. In this embodiment, the external teeth of the sliding sleeve have two lateral external teeth sections between which the annular groove extends.

In an advantageous embodiment of the device according to the invention, the rotational speed sensor is formed and arranged on the shift element for actuating the sliding sleeve in such manner that the sensor element arranged on or in the speed sensor projects into the annular groove of the sliding sleeve and determines the speed of the sliding sleeve, and thus too the speed of the transmission shaft, in the axial direction on at least one of the lateral surfaces of the external teeth section facing toward the groove. This ensures that the sensor element of the rotational speed sensor can access the same measuring teeth in any shift position, whereby high signal quality can be obtained. The sliding sleeve, the shift element and the speed sensor attached on the shift element follow the wobbling motion of the transmission shaft. Thus, compared with the prior art, the relative movement between the sensor element and the measuring teeth, caused by the wobbling motion and which influences the measurement signal adversely, is substantially reduced. An air gap, which is needed between the speed sensor and the external teeth, can be made very small since there is no risk of clashing during a shifting operation. Accordingly, in the device according to the invention for determining the rotational speed of a transmission shaft, a standard sensor can be used, and there is no need for a much more expensive 'smart' sensor with its corresponding evaluation electronics. Furthermore, it is conceivable that the speed sensor and the sliding sleeve should be so designed that the speed sensor determines the rotational speed of the sliding sleeve in the radial direction at the external teeth. For this, the sliding sleeve must be made correspondingly wider so that even when the sliding sleeve is in one of its clutch positions, the speed sensor can still detect the external teeth without colliding with the transmission component to be coupled.

In another advantageous embodiment of the device according to the invention, the rotational speed sensor is made as an independent sensor unit comprising at least one sender and an integrated energy source. The sensor signal is transmitted by wireless means to a corresponding receiver arranged in or on a sensor module and/or an electronic control unit. The signal can be transmitted, for example, by electromagnetic radio waves. The electronic control unit is, for example, the control unit for controlling the transmission of a motor vehicle. Thanks to this wireless signal transmission, there is no need for elaborate and expensive wiring. It may be necessary in such a case for the transmission housing to have a part which is permeable to electromagnetic waves. Energy can be supplied to the independent sensor unit, for example from an accumulator or battery supply system.

In a particularly preferred embodiment, the energy required for operating the sensor unit can be produced from mechanical vibrational energy. A piezo-element, for example in the form of piezoelectric foil or a piezoelectric ceramic platelet, is arranged in or on the sensor housing of the sensor unit for that purpose. Advantageously, the piezo-element is arranged in the sensor housing in such a manner that to produce energy, the mechanical vibrational energy produced during a shifting process and/or by the wobbling motion of the transmission shaft is converted to electrical energy by the piezo-element. During a shifting process the sliding sleeve encounters the transmission component to be coupled, so that part of the kinetic energy of the shifting element is converted to electrical energy when the sliding sleeve encounters the transmission component to be coupled. Likewise, it is conceivable that the energy needed for operating the sensor unit could be produced by a vibration generator, which converts the oscillations or vibrations acting upon the sensor unit during a shifting process or due to the wobbling motion of the transmission shaft into electrical energy.

In another embodiment of the device according to the invention, the rotational speed sensor is connected to the sensor module and/or the electronic control unit by at least one connecting lead and the sensor signal can be transmitted to the sensor module and/or electronic control unit by the connecting lead.

In a particularly preferred embodiment of the device according to the invention, the shifting element for moving the sliding sleeve is in the form of a shift fork, which can be actuated for example by a shift rail.

Accordingly, for the device according to the invention for determining the rotational speed of a transmission shaft, neither a toothed disk made as a speed indicator, nor a long sensor arm for positioning the speed sensor near the speed indicator are needed. Furthermore, the device according to the invention has no need of a 'smart' sensor with expensive integrated evaluation electronics, and the sensor signal can be detected from the same measurement teeth in any clutch position of the sliding sleeve.

The transmission according to the invention, in particular for a motor vehicle, contains the device according to the invention for determining the rotational speed of a transmission shaft.

In a preferred embodiment of the transmission according to the invention the transmission shaft is the main shaft of the transmission, and two countershafts are also provided, between which the main shaft is mounted in a floating manner.

BRIEF DESCRIPTION OF THE DRAWINGS

Below, the basic principle of the invention, which allows several embodiments, is explained in more detail with reference to a drawing, which shows.

DETAILED DESCRIPTION OF THE PREFERRED EMBODIMENTS

Figure 1:
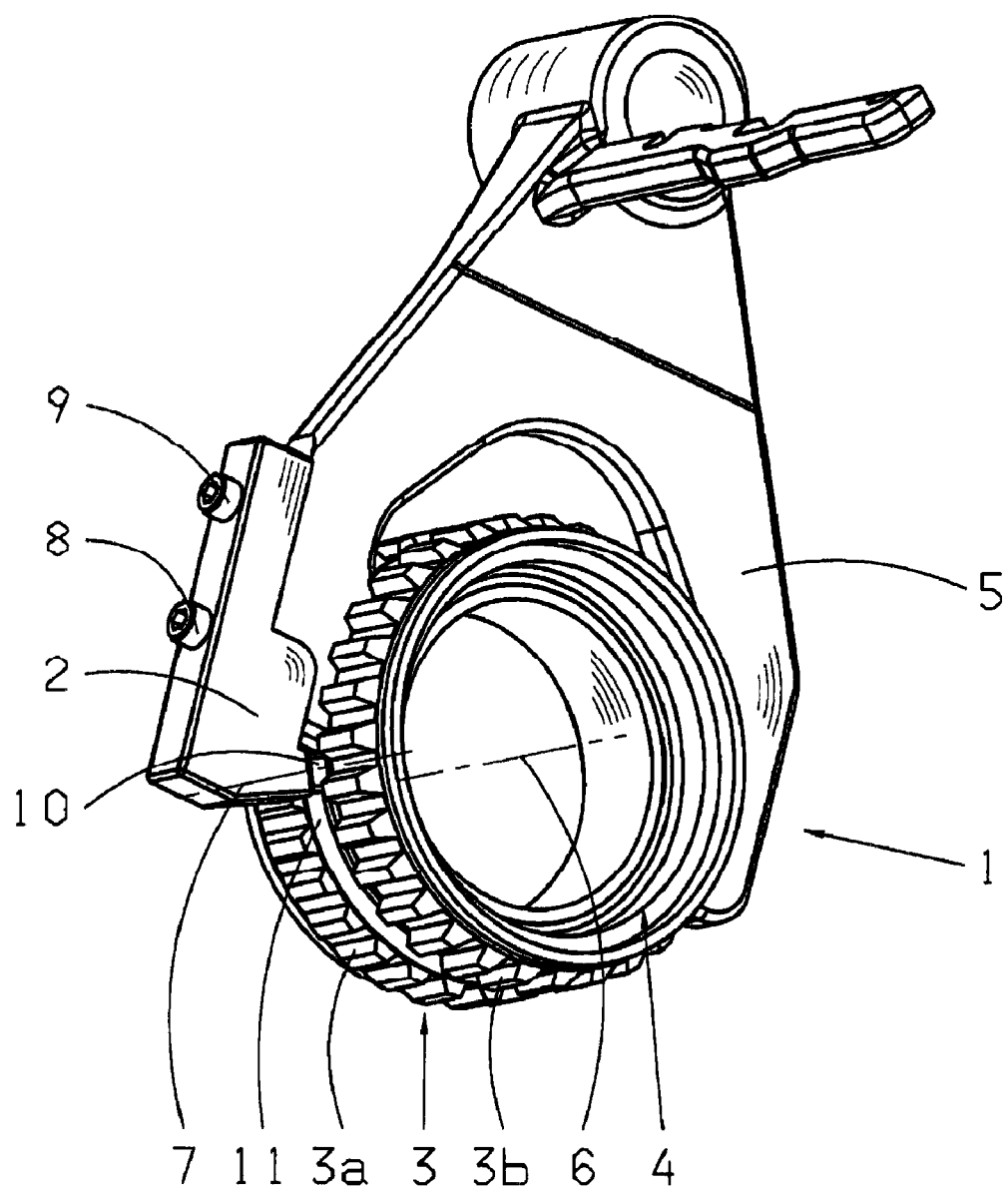
FIG. 1: An embodiment of the device according to the invention for determining the rotational speed of a transmission shaft.

The embodiment of the device according to the invention for determining the rotational speed of a transmission shaft, illustrated in FIG. 1, comprises a speed sensor 2 and a speed indicator 3. The speed sensor 2 in this case comprises a sensor element 10 by means of which the rotational speed at the speed indicator 3 can be measured. In this embodiment the speed indicator 3 is formed by the external teeth of a sliding sleeve 4 of a clutch device 1. The speed sensor 2 is arranged on a shifting element 5, this shifting element 5 being in the form of a shift fork for actuating the sliding sleeve 4. By means of fastening elements 8, 9 the speed sensor 2 is screwed firmly to the shift fork 5. The sliding sleeve 4 has an annular groove 11 in which the shift fork 5 engages in order to actuate the sliding sleeve 4. The external teeth 3 of the sliding sleeve comprise two lateral external teeth sections 3a, 3b, between which the annular groove 11 extends.

The rotational speed sensor is formed and fixed on the shift fork 5 for actuating the sliding sleeve 4 in such manner that the sensor element 10 in the rotational speed sensor 2 projects into the annular groove 11 of the sliding sleeve 4 and detects the rotational speed of the sliding sleeve 4 in the axial direction on a side surface of the external teeth section 3a, 3b facing toward the groove 11. This ensures that the sensor element 10 of the speed sensor 2 accesses the same set of measurement teeth 3a, 3b in any shift position of the sliding sleeve 4, which can move in the axial direction of a main transmission axis 6 to a neutral position, a first clutch position and a second clutch position, whereby a high signal quality can be achieved. An air gap needed between the speed sensor 2 and the external teeth sections 3a, 3b can be made very small, since during a shifting process there is no risk of clashing. In this case the rotational speed sensor 2 is arranged on the shift fork 5 in such manner that the sensor's measurement axis 7 is parallel to the main transmission axis 6.

Figure 2:
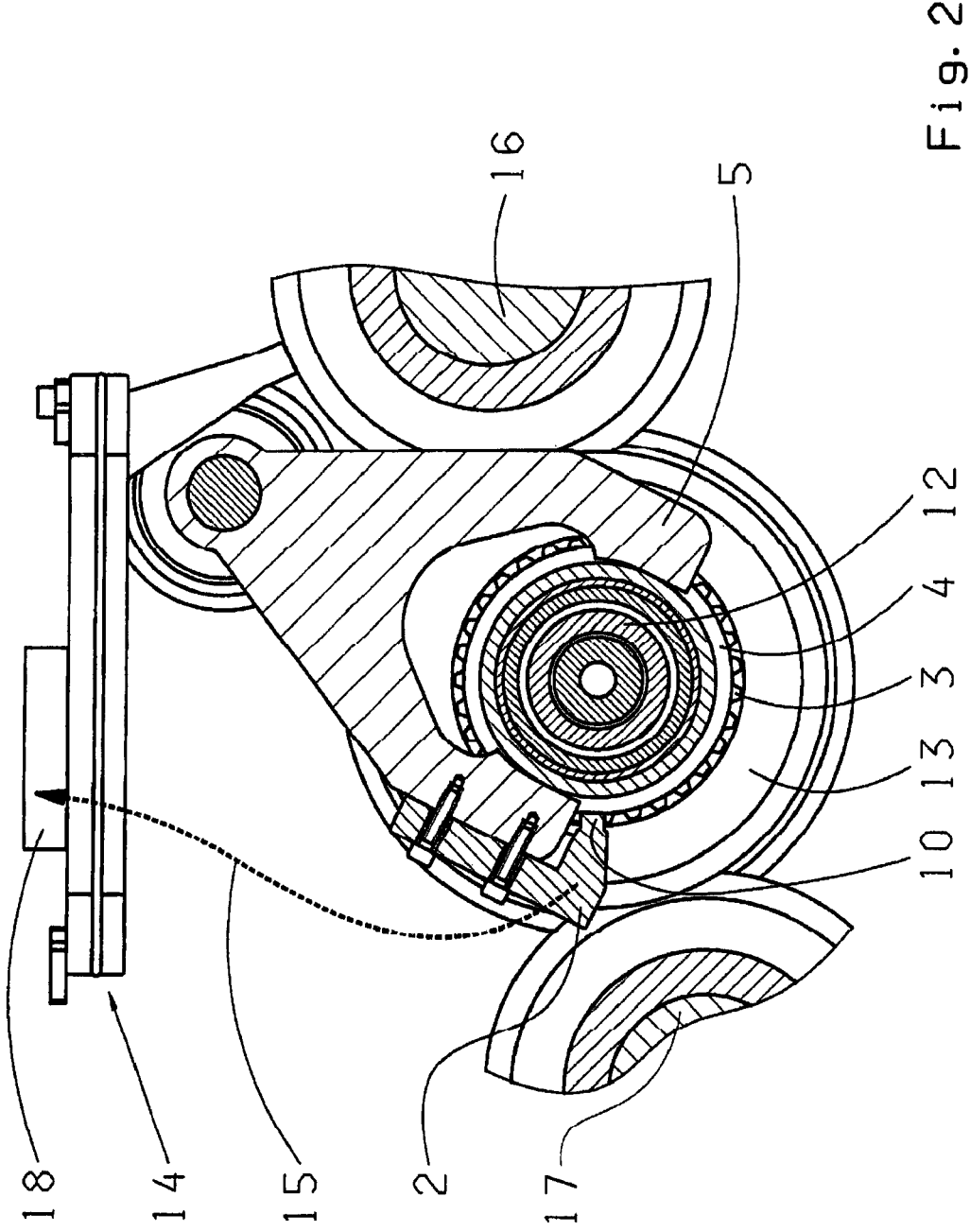
FIG. 2: An embodiment of the device according to the invention, shown in a partially sectioned view.

FIG. 2 shows a sectioned representation of the embodiment of the device according to the invention described with reference to FIG. 1. The sliding sleeve 4 is arranged to move axially on a transmission shaft 12 and is connected in a rotationally fixed manner to the shaft 12. In this case the transmission shaft 12 is the main transmission shaft of a motor vehicle transmission, and in addition there are two countershafts 16, 17 between which the main shaft 12 is fitted in a floating manner. By means of the sliding sleeve 4 loose gearwheels 13 arranged to rotate on the main shaft 12 can be connected in a rotationally fixed manner to the main shaft 12 by corresponding claw-like short teeth, for example located laterally on the loose gearwheels 13.

During wobbling motion of the main shaft 12, both the sliding sleeve 4 and the shift fork 5 along with the speed sensor 2 attached to the shift fork 5 follow the wobbling motion, whereby the relative movement between the sensor element 10 and the measurement teeth 3a, 3b caused by the wobbling motion of the main shaft 12, which would otherwise adversely affect the measurement signal, is kept so small that the measurement signal can be picked up by a standard sensor despite the wobbling motion of the main shaft 12, so that there is no need for an expensive 'smart' sensor with the corresponding evaluation electronics.

The rotational speed sensor 2 is in this case made as an independent sensor unit, which comprises at least one sender and an integrated energy supply (not shown here). The sensor signal is transmitted by wireless means to a corresponding receiver 18, in this case arranged on a sensor module 14. The wireless signal transmission 15 can take place for example by electromagnetic radio waves. Thanks to this wireless transmission 15 there is no need for elaborate and expensive wiring.

A piezo-element (not shown here) is arranged in or on the housing of the speed sensor 2 in such manner that to provide an energy supply, the mechanical vibration energy produced during a shifting operation and/or when the main shaft 12 is wobbling, is converted to electrical energy by the piezo-element. During a shifting operation the sliding sleeve 4 encounters the loose gearwheel 13 to be coupled, so that part of the kinetic energy of the shift fork 5 is converted to electrical energy when the sliding sleeve 4 impacts against the loose gearwheel 13.

INDEXES

1 Clutch device
2 Rotational speed sensor
3 Rotational speed indicator, external teeth of the sliding sleeve
3a Measurement teeth, section of the external teeth of the sliding sleeve
3b Measurement teeth, section of the external teeth of the sliding sleeve
4 Sliding sleeve
5 Shifting element, shift fork
6 Main transmission axis
7 Sensor measurement axis
8 Fastening element
9 Fastening element
10 Sensor element
11 Annular groove
12 Transmission shaft, main shaft
13 Transmission component to be coupled, loose gearwheel
14 Sensor module
15 Wireless signal transmission, electromagnetic radio waves
16 Countershaft
17 Countershaft
18 Receiver

The invention claimed is:

1. A device for determining a rotational speed of a transmission shaft (12), the device comprises:
   a speed indicator (3) being continuously connected to a sliding sleeve which is connected, in a rotationally fixed manner, to the transmission shaft (12), and the sliding sleeve being axially slidable on the transmission shaft,
   at least one rotational speed sensor (2) with at least one rotational speed sensor element (10), the sensor element (10) detecting the rotational speed of the transmission shaft (12) via the speed indicator (3),
   the speed sensor (2) being fixed to a shifting element (5), and the shifting element axially biasing the sliding sleeve along the transmission shaft
   the rotational speed indicator (3) being continuously connected on a circumference of the sliding sleeve (4) of a clutch device (1) which is movable, relative to an axial direction of the transmission shaft (12), to a neutral position, a first clutch position and a second clutch position,
   the sliding sleeve (4) comprising an annular groove (11) in which the shifting element (5) engages for axially biasing the sliding sleeve (4), and
   the external teeth (3) of the sliding sleeve 4 having two lateral tooth sections (3a, 3b) with the annular groove (11) extending therebetween.

2. The device according to claim 1, wherein the speed indicator (3) comprises external teeth of the sliding sleeve (4) connected, in a rotationally fixed manner, to the transmission shaft (12).

3. The device according to claim 1, wherein the rotational speed sensor (2) is designed and arranged on the shifting element (5) such that the sensor element (10), arranged either on or in the speed sensor (2), projects into the annular groove (11) and detects the rotational speed of the sliding sleeve (4) and thus the speed of the transmission shaft (12), and at least one lateral surface of the external tooth sections (3a, 3b) facing toward the groove (11).

4. The device according to claim 3, wherein the rotational speed sensor (2) is an independent sensor unit which comprises a sender and an integrated energy supply and a sensor signal is wirelessly transmitted, to at least one of a sensor module (14) and an electronic control unit.

5. The device according to claim 4, wherein electrical energy necessary for operating the independent sensor unit is produced by mechanical vibration energy.

6. The device according to claim 5, wherein a piezo-element produces the electrical energy by converting the mechanical vibration energy produced at least one of during a shift operation and due to wobbling motion of the transmission shaft (12).

7. The device according to claim 4, wherein the speed sensor (2) is connected by at least one connection lead to at least one of the sensor module (14) and to the electronic control unit, and the sensor signal is transmitted by the connection lead.

8. The device according to claim 7, wherein the shifting element (5), for moving the sliding sleeve (4), is a shift fork.

9. A device for determining a rotational speed of a transmission shaft (12) of a motor vehicle, the device comprising:
a clutch device comprising a sliding sleeve and a rotational speed indicator, the sliding sleeve and the rotational speed indicator being continuously connected in a rotationally fixed manner to each other and the clutch device, the clutch device being continuously rotationally fixed to and axially slidable along a transmission shaft;
a shifting element comprising at least one rotational speed sensor element continuously fixed thereto, the shifting element axially biasing the clutch device along the transmission shaft and the sensor element detects a rotational speed of the rotational speed indicator and thereby a rotational speed of the transmission shaft;
the rotational speed indicator comprising gear teeth that extend axially along and project radially about an exterior circumference of the sliding sleeve; and
an annular channel being located within the gear teeth which divides gear teeth into lateral sections that axially spaced from each other, the shifting element and the at least one rotational speed sensor element being axially located between the lateral sections of gear teeth for biasing the sliding sleeve in opposite axial directions and detecting the rotational speed of the rotational speed indicator.

10. The device according to claim 9, wherein the at least one rotational speed sensor is located within the annular channel between the lateral sections of gear teeth.

11. The device according to claim 10, wherein the at least one rotational speed sensor is aligned adjacent an axial facing side surface of the lateral sections of gear teeth facing the groove.

* * * * *